United States Patent [19]
Wang

[11] Patent Number: 5,769,448
[45] Date of Patent: Jun. 23, 1998

[54] FOLDABLE FRAME ASSEMBLY FOR A TWO-SEAT STROLLER

[76] Inventor: Morgan Wang, 12F, No. 311, Fuhsing N. Rd., Taipei City, Taiwan

[21] Appl. No.: 742,739

[22] Filed: Nov. 1, 1996

[51] Int. Cl.[6] ...................................................... B62B 7/08
[52] U.S. Cl. ....................... 280/642; 280/658; 280/47.39; 280/47.4
[58] Field of Search .................................... 280/642, 641, 280/643, 657, 658, 47.38, 47.39, 47.4; 297/245

[56] References Cited

U.S. PATENT DOCUMENTS

| | | | |
|---|---|---|---|
| 4,834,415 | 5/1989 | Yee | 280/47.4 |
| 4,886,289 | 12/1989 | Yee et al. | 280/643 |
| 5,333,893 | 8/1994 | Chen | 280/642 |

FOREIGN PATENT DOCUMENTS

| | | | |
|---|---|---|---|
| 443051 | 2/1936 | United Kingdom | 280/642 |

*Primary Examiner*—Brian L. Johnson
*Assistant Examiner*—Avraham Lerner
*Attorney, Agent, or Firm*—Christie, Parker & Hale, LLP

[57] ABSTRACT

A foldable frame assembly includes two main frame units on which two seats can be mounted so as to permit two babies to sit on the front and rear parts of the stroller in a face-to-face relationship. The main frame units are designed so as to enable the seats to be turned to horizontal positions at the same time, thus permitting the babies to lie on the seats simultaneously. A spacer unit is interposed between the main frame units. The main frame units are interconnected by means of two aligned pairs of crossed links so as to perform the same operation when either is actuated in order to fold or unfold the stroller. A locking unit is provided on one of the main frame units for preventing the main frame units from movement relative to the spacer unit, and can be operated so as to permit one of the handle frames to move toward the other one in order to fold the frame assembly. Two handle frames are provided on the front and rear end portions for pushing the stroller in opposite directions.

8 Claims, 6 Drawing Sheets

5,769,448

FOLDABLE FRAME ASSEMBLY FOR A TWO-SEAT STROLLER

BACKGROUND OF THE INVENTION

1. Field of the Invention

This invention relates to a stroller, more particularly to a foldable frame assembly for a two-seat stroller which includes two main frame units interconnected by four links so that operations of the main frame units are the same when either is actuated in order to fold or unfold the stroller.

2. Description of the Related Art

A conventional two-seat stroller normally has two seats which are arranged one behind another and which face forward. This arrangement causes difficulties in folding and unfolding the stroller. When it is desired to lay a baby on the stroller, the rear seat is turned rearward to a horizontal position. However, because the front seat is blocked by the rear seat from turning rearward to a horizontal position, two babies cannot lie on the seats at the same time. Furthermore, only one handle is provided at the rear part of the conventional stroller. As a result, the conventional stroller cannot be pushed rearward and pulled forward.

SUMMARY OF THE INVENTION

An object of this invention is to provide a foldable frame assembly for a two-seat stroller on which two babies can sit in a face-to-face relationship so that the frame assembly can be easily folded and unfolded and so that the seats can be turned outward to horizontal positions at the same time.

Another object of this invention is to provide a frame assembly for a two-seat stroller which has two handle frames that are provided on the front and rear parts of the stroller so that the stroller can be pushed in opposite directions.

According to this invention, a foldable frame assembly includes two main frame units on which two seats can be mounted so as to permit two babies to sit on the front and rear parts of the stroller in a face-to-face relationship. The main frame units are designed so as to enable the seats to be turned to horizontal positions at the same time, thus permitting the babies to lie on the seats simultaneously. A spacer unit is interposed between the main frame units. The main frame units are interconnected by means of four links so as to perform the same operation when either is actuated in order to fold or unfold the stroller. A locking unit is provided on one of the main frame units for preventing the main frame units from movement relative to the spacer unit, and can be operated so as to permit one of the handle frames to move toward the other one in order to fold the frame assembly. Two handle frames are provided on the front and rear end portions of the frame assembly so as to push the stroller in the opposite directions.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENT

Figure 1:
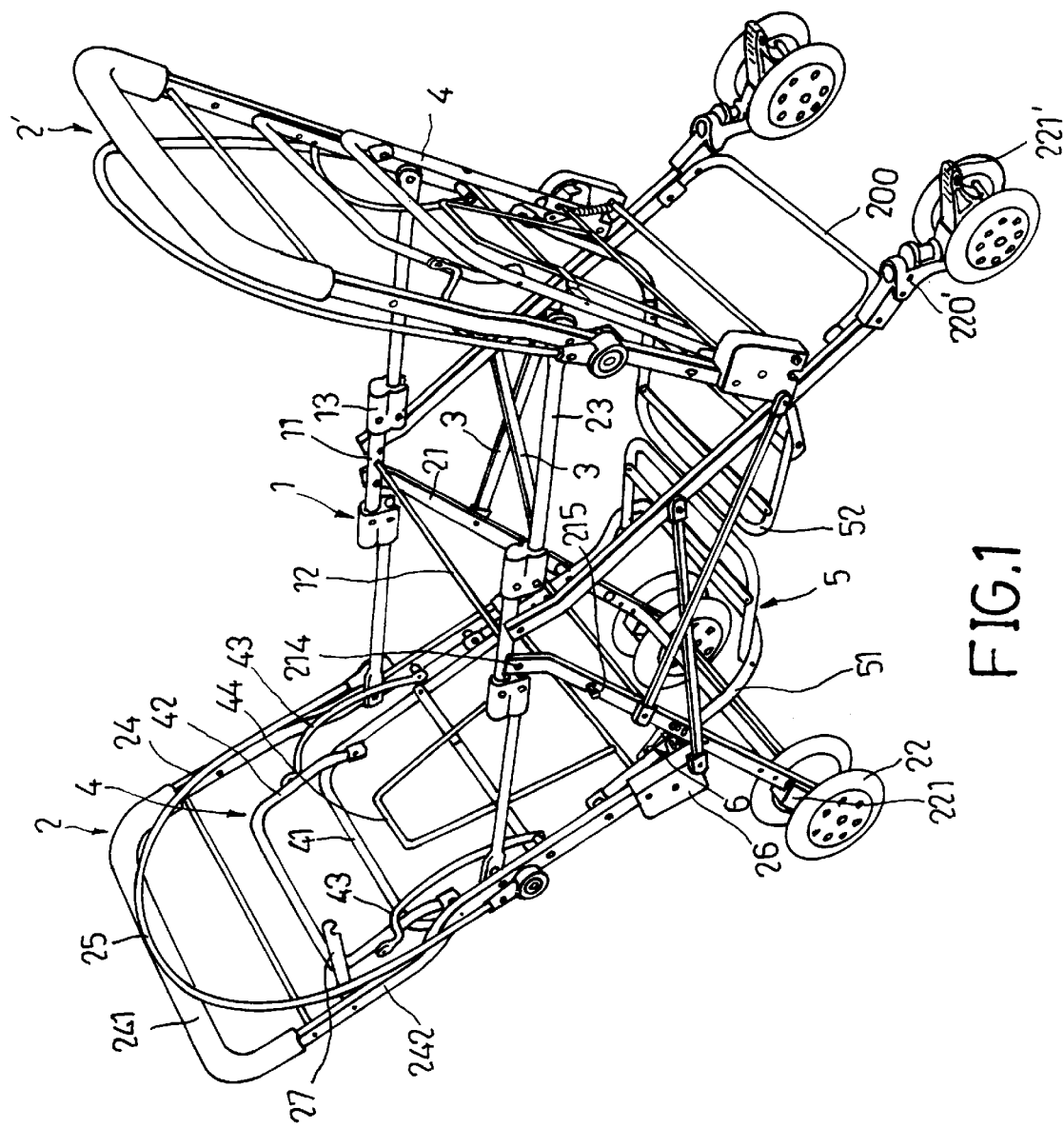
FIG. 1 is a perspective view of a foldable frame assembly for a two-seat stroller according to this invention.
Figure 2:
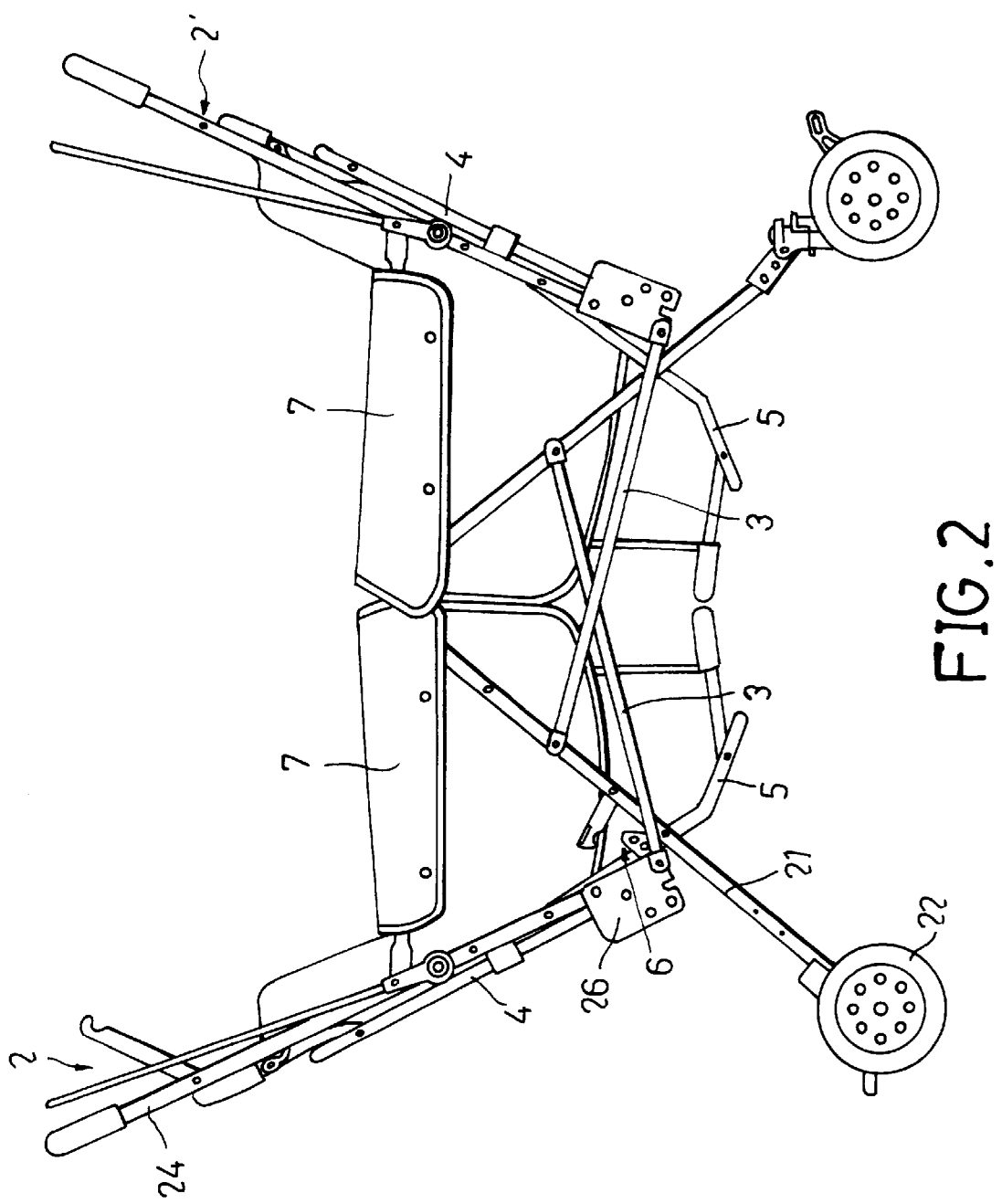
FIG. 2 is a side view of a two-seat stroller incorporating the foldable frame assembly of this invention.

Referring to FIGS. 1 and 2, a foldable frame assembly for a two-seat stroller according to this invention includes an I-shaped spacer unit 1 and two similar main frame units 2, 2' which are located on two sides of the spacer unit 1 and which are interconnected by means of two aligned pairs of crossed links 3, which pairs are located on two sides of the corresponding seat 7. Each of the main frame units 2, 2' is coupled with a backrest unit 4 and a footrest unit 5. The rear main frame unit 2 is provided with a locking unit 6. Two seats 7 are supported on the main frame units 2, 2' so that two babies (not shown) can sit on the seats 7 in a face-to-face relationship due to the fact that the seats 7 are located between the backrest units 5. Each of the main frame units 2, 2' has a lower end portion provided with a transverse support rail 200. If necessary, a rectangular storage net or cloth (not shown) can be fastened to the support rails 200 so as to permit placing of an object thereon.

Figure 3:
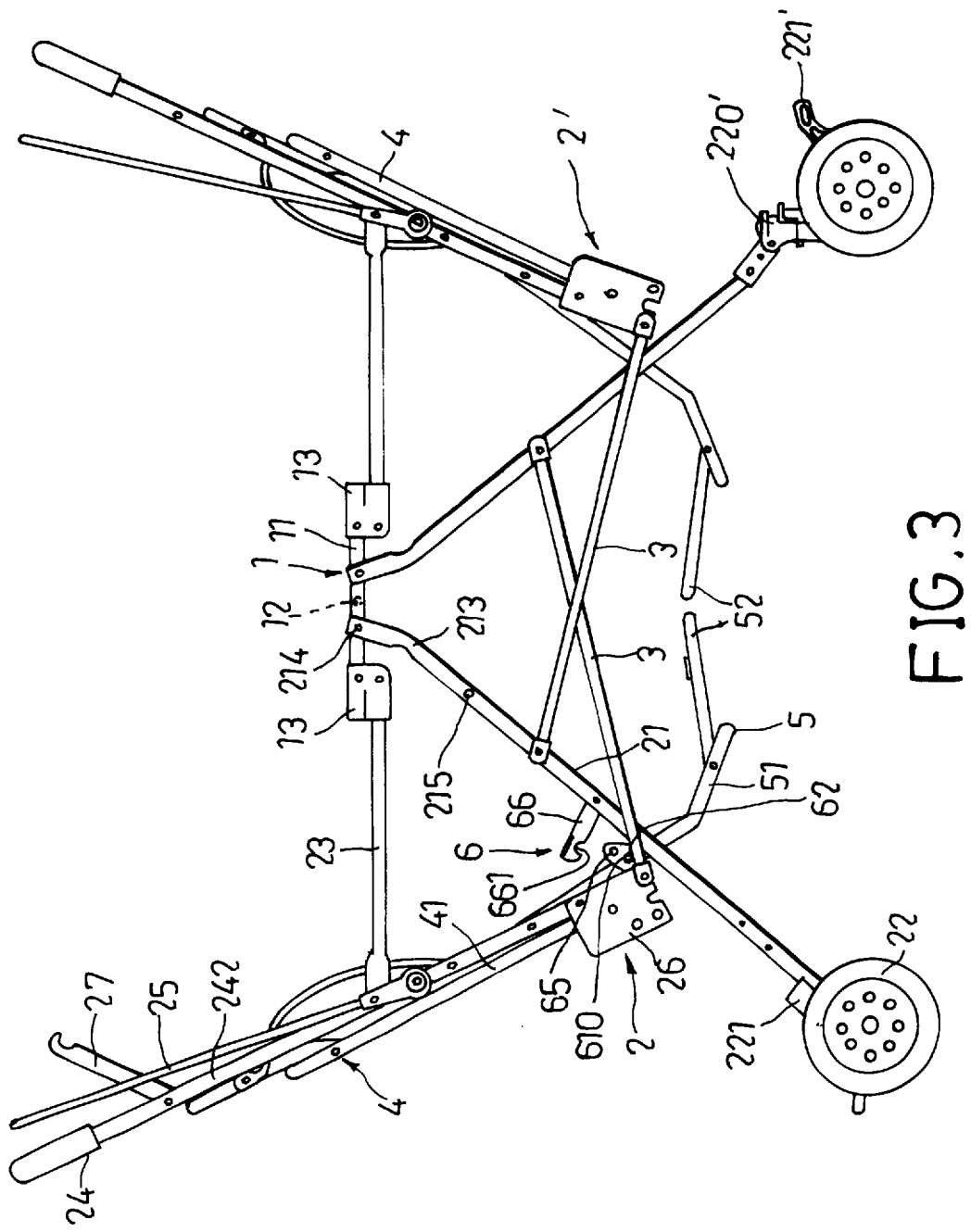
FIG. 3 is a side view showing the foldable frame assembly of this invention.

As shown in FIGS. 1, 2 and 3, the I-shaped spacer unit 1 is located at the middle of the frame assembly and includes two aligned coupling rods 11 which are located on two sides of the seats 7 and which are parallel to the moving direction of the stroller, and a transverse middle rod 12 which has two ends secured to the coupling rods 11 and which is located between the seats 7. Each of the coupling rods 11 has two ends, each of which is provided with a fixed coupling block 13.

Each of the main frame units 2, 2' is located on two sides of the middle rod 12 and includes two inclined and aligned leg rods 21 located on two sides of the seat 7 and having upper ends pivoted to the coupling rods 11 respectively by means of horizontal pivots 214 and lower ends carrying two wheels 22 respectively, two pivot rods 23 parallel to the coupling rods 11 and having inner ends pivoted to the coupling blocks 13 respectively, an inverted U-shaped handle frame 24 having a top rail 241 and two generally vertical side rods 242 which are pivoted to the outer ends of the pivot rods 23, an umbrella frame 25 pivoted to the side rods 242 of the handle frame 24, and two pivot blocks 26 mounted fixedly on the lower ends of the side rods 242 of the handle frame 24. As illustrated, each of the rear wheels 22 is provided with a conventional brake unit 221 while each of the front wheels 22 is provided with a conventional moving-direction limiting unit 220' and a conventional brake unit 221'. A lock hook 27 is pivoted to the rear handle frame 24 and can be turned to engage a lock pin 215 on the right rear leg rod 21 within a lock notch in the lock hook 27 when the frame assembly is folded, thus preventing unintentional unfolding of the frame assembly.

Each pair of the links 3 are arranged as an X-shape. Each of the links 3 is pivoted to an intermediate portion of one of the leg rods 21 of one of the main frame units 2 at the upper end thereof and to one of the pivot blocks 26 of the other one of the main frame units 2 at the lower end thereof.

Figure 4:
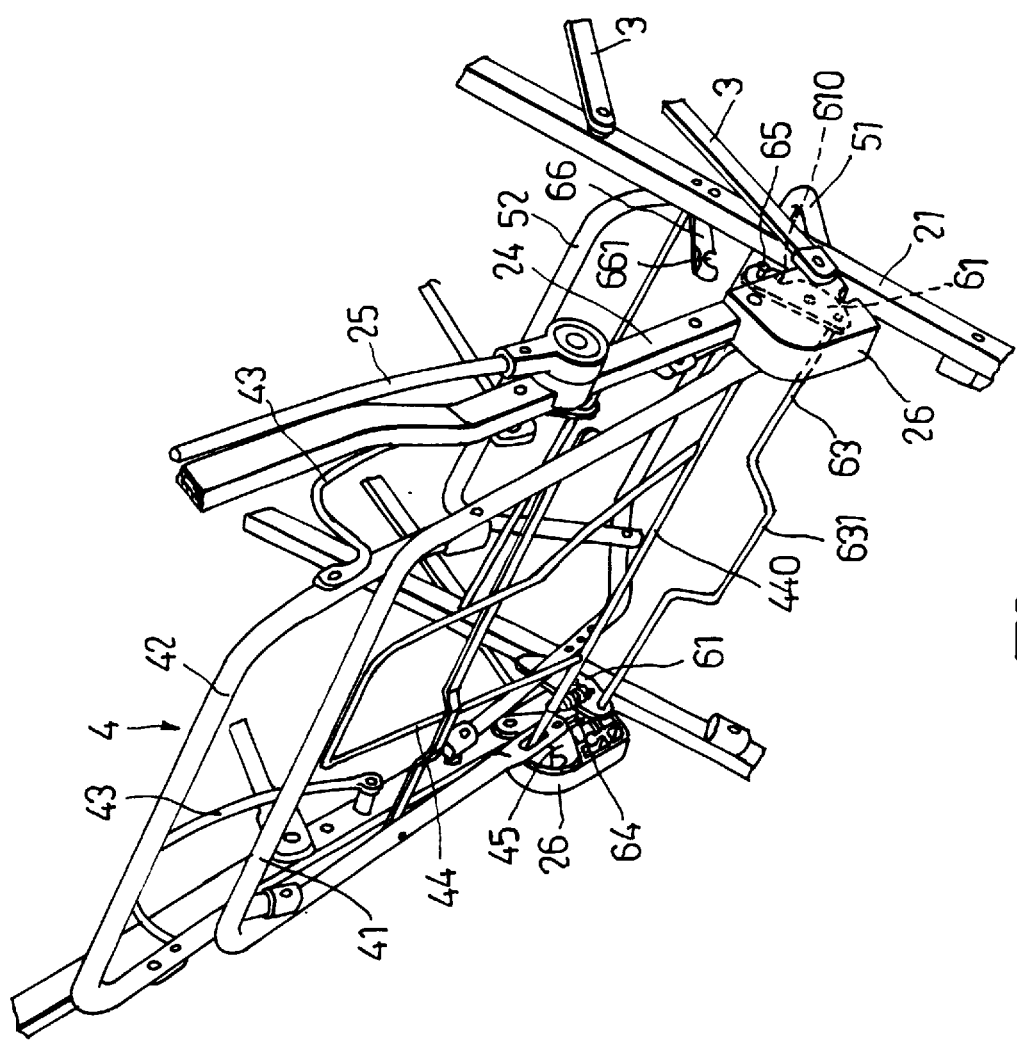
FIG. 4 is a perspective view illustrating the structure of the locking unit of the foldable frame assembly according to this invention.

Referring to FIGS. 1 and 4, each of the backrest units 4 includes an inverted U-shaped backrest rod 41, an inverted U-shaped headrest rod 42, a swing rod 43, an inverted U-shaped movable frame 44 and a seat-angle adjusting unit 45. As best shown in FIG. 4, the inverted U-shaped backrest rod 41 has a top rail and two inclined parallel arms which are respectively and integrally formed with two ends of the top rail of the backrest rod 41 and which are respectively pivoted to the pivot blocks 26 of the corresponding main frame unit at the lower ends thereof. The inverted U-shaped headrest rod 42 has a top rail which is parallel to and slightly shorter than the top rail of the backrest rod 41, and two inclined parallel arms which are respectively and integrally formed with two ends of the top rail of the headrest rod 42 and which are respectively pivoted to the arms of the backrest rod 41 in such a manner that the arms of the headrest rod 42 abut against an intermediate portion of the top rail of the backrest rod 41 and that the headrest rod 42 can rotate about a horizontal axis. The swing rod 43 has an upper end attached to the headrest rod 42, and a lower end attached to the handle frame 24. When the seat is turned outward in order to adjust the angle of the seat, the upper end of swing rod 43 is movable relative to the lower end of the same. The inverted U-shaped movable frame 44 is confined within the backrest rod 41 and is fixed on a horizontal slide rod 440 which has two ends slidable on the arms of the backrest rod 41 in a direction parallel to the arms of the backrest rod 41. A baby can rest on the backrest rod 41, the headrest rod 42, and the movable frame 44 of one of the backrest units 4.

Referring again to FIGS. 1 and 4, each of the footrest units 5 includes an inclined and generally U-shaped support frame 51 and a U-shaped footrest frame 52. As illustrated, each of the support frames 51 has a bottom rail and two parallel arms which are respectively and integrally formed with two ends of the bottom rail and which are pivoted to the side rods of the corresponding handle frame 24 at the upper ends thereof and to the leg rods 21 of the corresponding main frame unit 2 at the lower parts thereof. The U-shaped footrest frame 52 has two generally horizontal, parallel arms which are respectively pivoted to the arms of the support frame 51 in such a manner that the footrest frame 52 can rotate about a horizontal axis and which abut against the bottom rail of the support frame 51.

Figure 5:
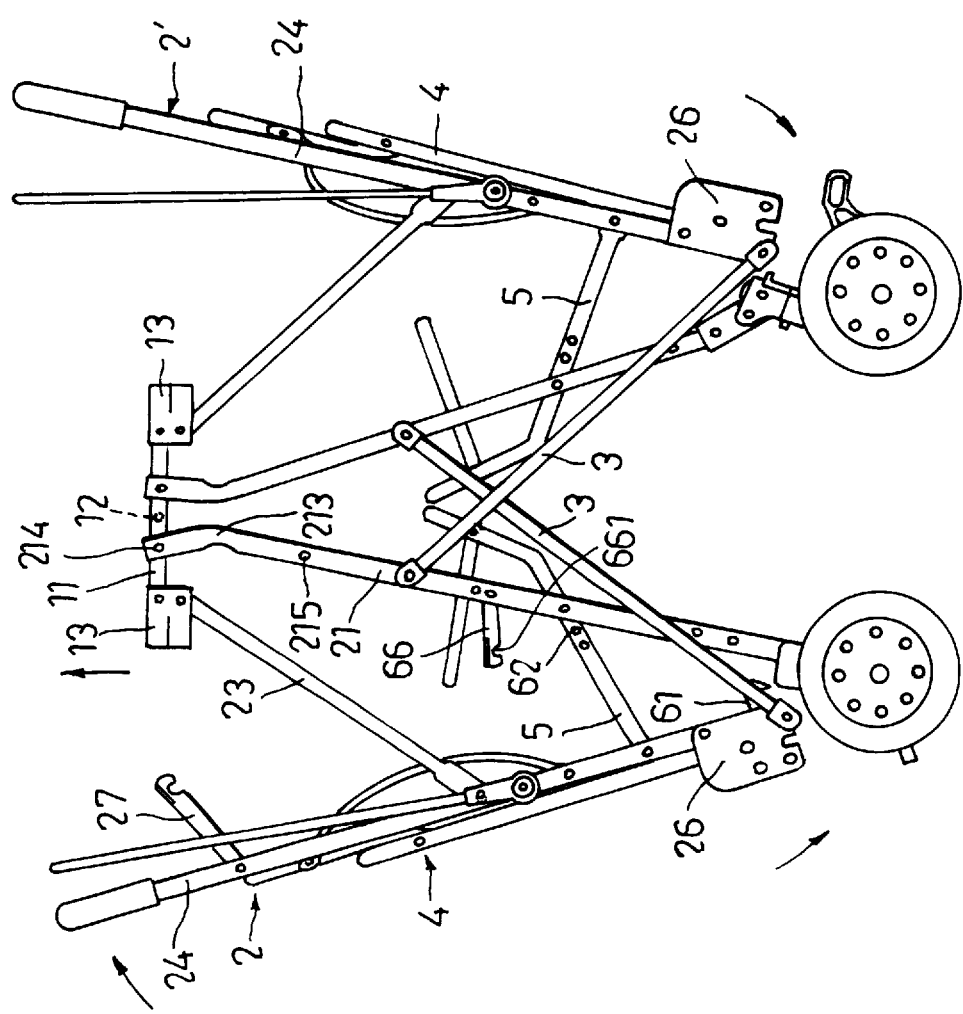
FIGS. 5 and 6 illustrate how the frame assembly of this invention is folded.

As shown in FIGS. 3 and 4, the locking unit 6 includes two elongated primary locking plates 61, two primary tongues 62, a control rod 63, two springs 64, an auxiliary tongue 65, and an elongated and inclined auxiliary locking plate 66. Each of the two elongated primary locking plates 61 is pivoted to the corresponding pivot block 26 of one of the main frame units 2, 2' at an intermediate portion thereof. Each of the primary locking plates 61 has a primary lock notch 610 which is formed in an end portion thereof. The primary tongues 62 (see FIG. 5) respectively projects from the frames of the corresponding support frame 51 into the corresponding primary lock notch 610. The springs 64 bias the primary locking plates 61 to press against the primary tongues 62 so as to engage the primary tongues 62 within the primary lock notches 61, thus locking the pivot blocks 26 on the leg rods 21. The control rod 63 interconnects the primary locking plates 61 and is operable to disengage the primary tongues 62 from the primary lock notches 610 of the primary locking plates 61 so as to permit folding of the main frame assembly. The elongated and inclined auxiliary locking plates 66 has an upper end pivoted to one of the leg rods 21, and a lower end which has an auxiliary lock notch 661 formed in a lower edge thereof. The auxiliary tongue 65 projects from one of the primary locking plates 61 into the auxiliary lock notch 661 of the primary locking plate 66 so as to form a double lock for the pivot blocks 26 on the leg rods 21.

As illustrated, when the stroller is unfolded, the distance between the curved upper end portions 213 of the leg rods 21 is larger than that between the pivots 214 so that the wheels 22 carried on the lower ends of the main frame units 2, 2' can rotate smoothly on the ground. Because the handle frames 24 are provided on the front and rear sides of the main frame units 2, 2', the stroller can be conveniently pushed in opposite directions by gripping one of the handle frames 24. The backrest units 4 can be turned outward to horizontal positions at the same time by operating the seat-angle adjusting unit 45 in a known manner, thus permitting two babies to lie on the seats simultaneously.

When it is desired to unfold the stroller, the auxiliary locking plate 66 is turned upward so as to disengage the auxiliary tongue 65 from the auxiliary lock notch 661 while holding the rear handle frame 24. At this time, by stepping on the U-shaped bent section 631 of the control rod 63, the primary locking plates 61 are removed from the primary tongues 62 against biasing action of the spring 64. In this situation, when it is desired to fold the stroller, the rear handle frame 24 is pushed forward or the middle rod 12 of the spacer unit 1 is raised to the positions of FIGS. 5 and 6 in sequence. At the completely folded position of the stroller, the rear wheels 22 contact the front wheels 22 and the distance between the curved upper end 213 of the leg rods 21 is smaller than that between the pivots 214. In this situation, each of the handle frames 24 is located at an almost vertical position. Forward movement of the rear handle frame 24 moves upward the spacer unit 1 and turns forward the rear backrest unit 4 and the rear handle frame 24 about the pivots which interconnect the rear handle frame 24 and the links 3. Because the links 3 interconnect the main frame units 2, 2', the main frame units 2, 2' perform the same operation when folding the stroller. After the stroller has been folded into the position shown in FIG. 6, the lock hook 27 of the rear handle frame 24 can be turned to hook over the lock pin 215 of the right rear leg rod 21 in order to maintain the folded structure of the stroller for storage or transportation.

Figure 6:
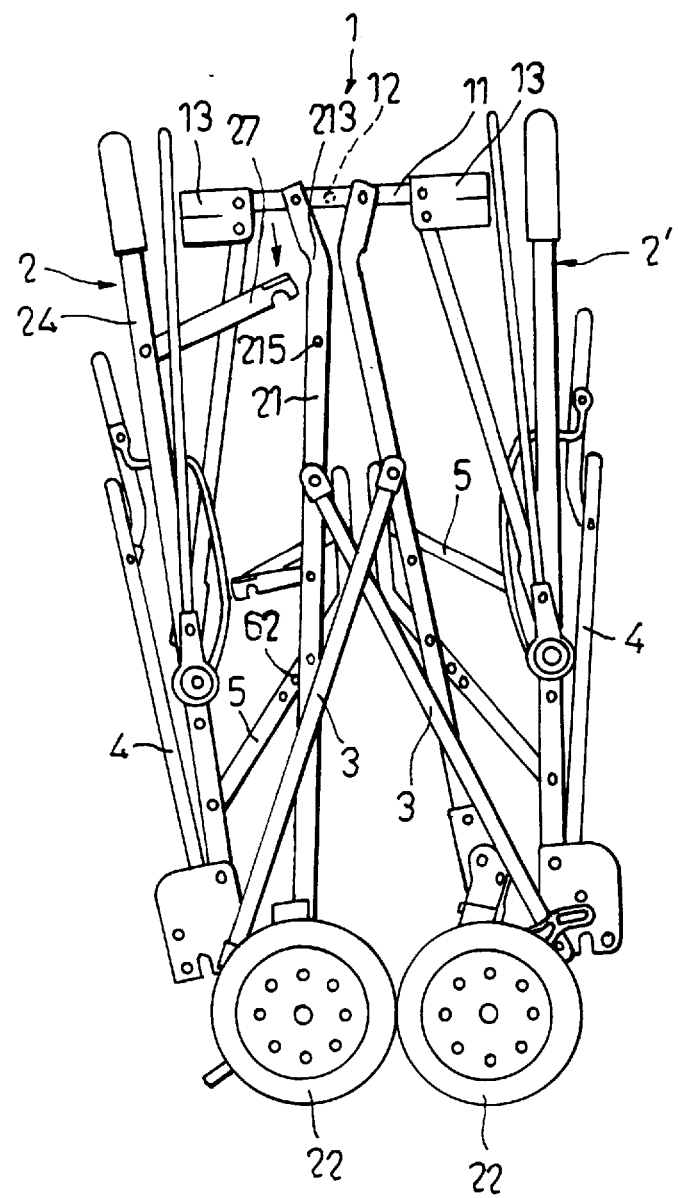

When it is desired to unfold the stroller shown in FIG. 6, the rear handle frame 24 of the stroller is pushed abruptly and forwardly while the same is held. Alternatively, the spacer unit 1 may be depressed.

It can be appreciated that this invention has the following advantages:

(1) The seats can be turned to horizontal positions at the same time or at different times.

(2) By pushing forward the rear handle frame 24 toward the front handle frame 24 or by raising the middle rod 12 while stepping on the control rod 63 (see FIG. 4), the stroller can be easily folded from a position in which the seats 7 are facing each other (see FIG. 2) to the position of FIG. 6.

(3) When the stroller is folded, two pairs of front and rear wheels 22 are adjacent to each other so as to improve safety in folding and so as to facilitate transportation of the stroller.

(4) The stroller can be easily unfolded by pushing abruptly and forwardly the rear handle frame 24 or by depressing the spacer unit 1 while holding the rear handle frame 24.

With this invention thus explained, it is apparent that numerous modifications and variations can be made without departing from the scope and spirit of this invention. It is therefore intended that this invention be limited only as indicated in the appended claims.

I claim:

1. A frame assembly for a stroller, said frame assembly being adapted to mount two seats thereon one behind another so as to permit two babies to sit thereon in a face-to-face relationship, said frame assembly being capable of being pushed to move in a moving direction, said frame assembly comprising:

an I-shaped spacer unit located at the middle of said frame assembly and including two aligned coupling rods which are adapted to be located on two sides of the seats and which are parallel to said moving direction, and a transverse middle rod which has two ends secured to said coupling rods and which is adapted to be located between the seats, each of said coupling rods having two ends, each of which is provided with a fixed coupling block;

two main frame units located on two sides of said middle rod and adapted to support the seats thereon, each of said main frame units including two inclined and aligned leg rods adapted to be located on two sides of a corresponding one of the seats and having upper ends pivoted to said coupling rods respectively and lower ends carrying two wheels respectively, a handle frame having two generally vertical side rods which are secured to each other, two pivot rods parallel to said coupling rods and having inner ends pivoted to said coupling blocks respectively and outer ends pivoted to said side rods of said handle frame, and two pivot blocks respectively and fixedly mounted on lower ends of said side rods of said handle frame;

two aligned pairs of inclined links, said two aligned pairs being adapted to be located on two sides of said seats, each pair of said links being arranged as an X-shape, each of said links being pivoted to an intermediate portion of one of said leg rods of one of said main frame units at an upper end thereof and to one of said pivot blocks of the other one of said main frame units at a lower end thereof;

two aligned backrest units attached to said main frame units respectively, each of said backrest units being located between two side rods of a corresponding one of said main frame units;

two aligned footrest units respectively attached to lower end portions of said handle frames and located between said handle frames; and a locking unit attached between said pivot blocks of one of said main frame units so as to lock said main frame units relative to said spacer unit, said locking device being operable to permit said main frame units to be folded by pushing one of said handle frames toward the other one of said handle frames.

2. A frame assembly for a stroller as claimed in claim 1, wherein each of said backrest units includes an inverted U-shaped backrest rod having a top rail and two inclined parallel arms which are respectively and integrally formed with two ends of said top rail of said backrest rod and which are respectively attached to said pivot blocks of a corresponding one of said main frame units at lower ends thereof.

3. A frame assembly for a stroller as claimed in claim 2, wherein each of said backrest units further includes an inverted U-shaped headrest rod having a top rail which is parallel to and slightly shorter than said top rail of said backrest rod and two inclined parallel arms which are respectively pivoted to said arms of said backrest rod in such a manner that said arms of said headrest rod abut against an intermediate portion of said top rail of said backrest rod and that said headrest rod can rotate about a horizontal axis.

4. A frame assembly for a stroller as claimed in claim 3, wherein each of said backrest units further includes an inverted U-shaped movable frame confined within said backrest rod and movable relative to said backrest rod in a direction parallel to said arms of said backrest rod, whereby each of a pair of babies can rest on said headrest rod, said backrest rod and said movable frame of one of said backrest units.

5. A frame assembly for a stroller as claimed in claim 1, wherein each of said footrest units includes an inclined and generally U-shaped support frame having a bottom rail and two parallel arms which are respectively and integrally formed with two ends of said bottom rail and which are pivoted to said side rods of a corresponding one of said handle frames at upper ends thereof and to said leg rods of a corresponding one of said main frame units at lower parts thereof.

6. A frame assembly for a stroller as claimed in claim 5, wherein each of said footrest units further includes a U-shaped footrest frame having two generally horizontal, parallel arms which are respectively pivoted to said arms of said support frame in such a manner that said footrest frame can rotate about a horizontal axis and which abut against said bottom rail of said support frame.

7. A frame assembly for a stroller as claimed in claim 5, wherein said locking unit includes:

two elongated primary locking plates, each of which is pivoted to a respective one of said pivot blocks of one of said main frame units at an intermediate portion thereof and each of which has a primary lock notch formed in an end portion thereof;

two primary tongues respectively projecting from said arms of said support frame of one of said footrest units into said primary lock notches;

a spring biasing said primary locking plates to press against said primary tongues so as to engage said primary tongues within said primary lock notches, thus locking said pivot blocks on said leg rods; and a control rod interconnecting said primary locking plates and being operable to disengage said primary tongues from said primary lock notches of said primary locking plates so as to permit folding of said frame assembly.

8. A frame assembly for a stroller as claimed in claim 7, wherein said locking unit further includes:

an elongated and inclined auxiliary locking plate having an upper end pivoted to one of said leg rods, and a lower end which has an auxiliary lock notch formed in a lower edge thereof; and an auxiliary tongue projecting from one of said primary locking plates into said auxiliary lock notch of said primary locking plate so as to form a double lock for said pivot blocks on said leg rods.

* * * * *